(12) United States Patent
Lucente

(10) Patent No.: US 10,411,748 B1
(45) Date of Patent: Sep. 10, 2019

(54) TELECOMMUNICATIONS CELL AND SATELLITE PHONE CASE WITH STYLUS PEN AND STORAGE COMPARTMENT FOR THE PEN

(71) Applicant: Lee Joan Lucente, Jacksonville, FL (US)

(72) Inventor: Lee Joan Lucente, Jacksonville, FL (US)

( * ) Notice: Subject to any disclaimer, the term of this patent is extended or adjusted under 35 U.S.C. 154(b) by 0 days.

(21) Appl. No.: 15/992,169

(22) Filed: May 29, 2018

(51) Int. Cl.
*H04B 1/3888* (2015.01)
*G06F 3/0354* (2013.01)
*H04M 1/02* (2006.01)

(52) U.S. Cl.
CPC ....... *H04B 1/3888* (2013.01); *G06F 3/03545* (2013.01); *H04M 1/0202* (2013.01)

(58) Field of Classification Search
CPC . H04B 1/3888; G06F 3/03545; H04M 1/0202
USPC ...................................... 455/575.8
See application file for complete search history.

(56) References Cited

U.S. PATENT DOCUMENTS

| 2006/0274493 | A1* | 12/2006 | Richardson | ........... G06F 1/1626 |
| | | | | 361/679.4 |
| 2015/0156297 | A1* | 6/2015 | Crawford | ................ H04M 1/04 |
| | | | | 455/26.1 |

* cited by examiner

*Primary Examiner* — Ayodeji O Ayotunde
(74) *Attorney, Agent, or Firm* — Delphine James

(57) ABSTRACT

The present invention comprises a protective case for a portable electronic device adapted with a storage compartment which houses a tethered stylus. The tethered stylus can be retractable. The stylus is attached to the protective case by way of a permanent tether and the storage compartment is integrally attached at one end of the protective case.

12 Claims, 12 Drawing Sheets

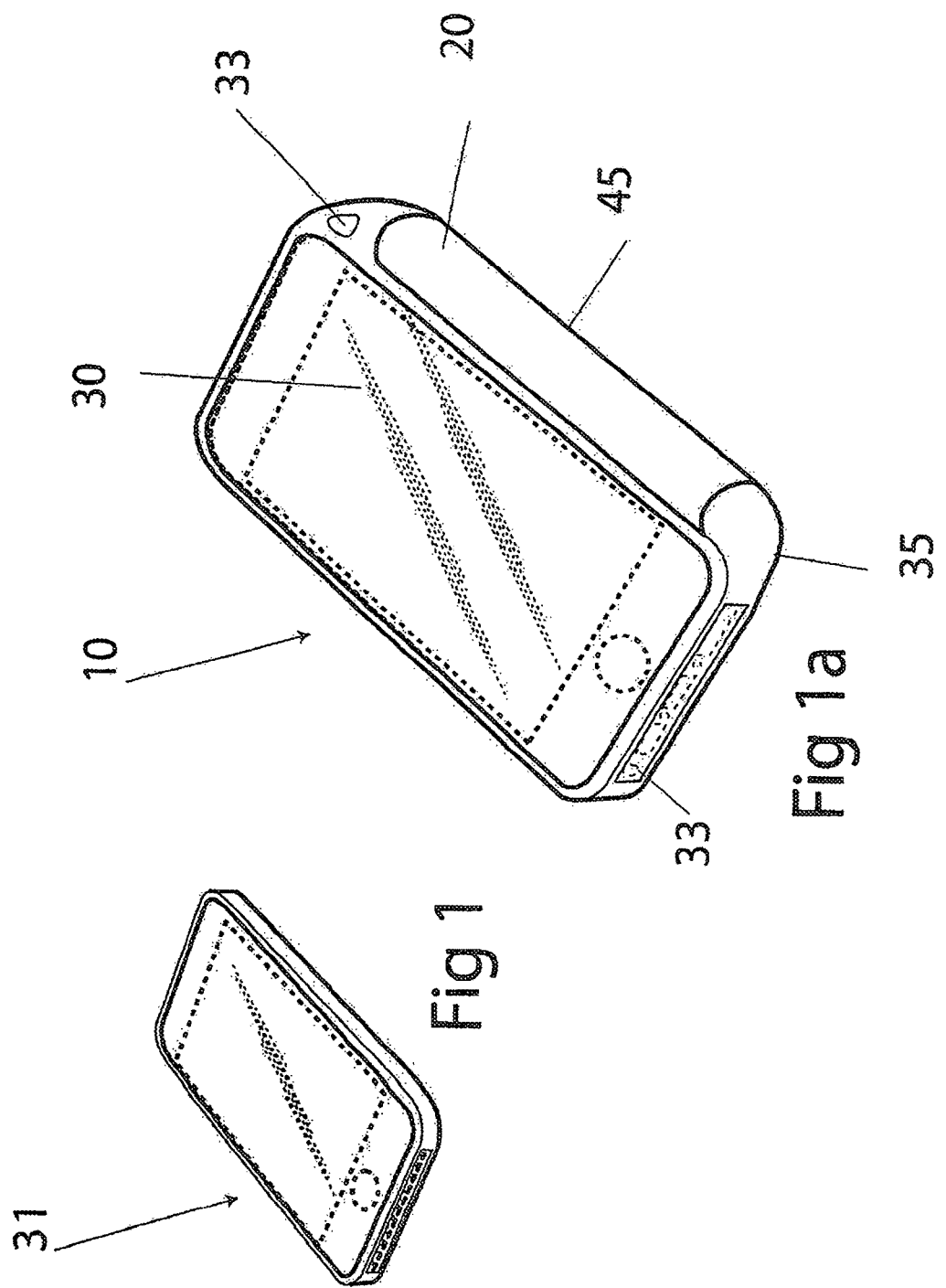

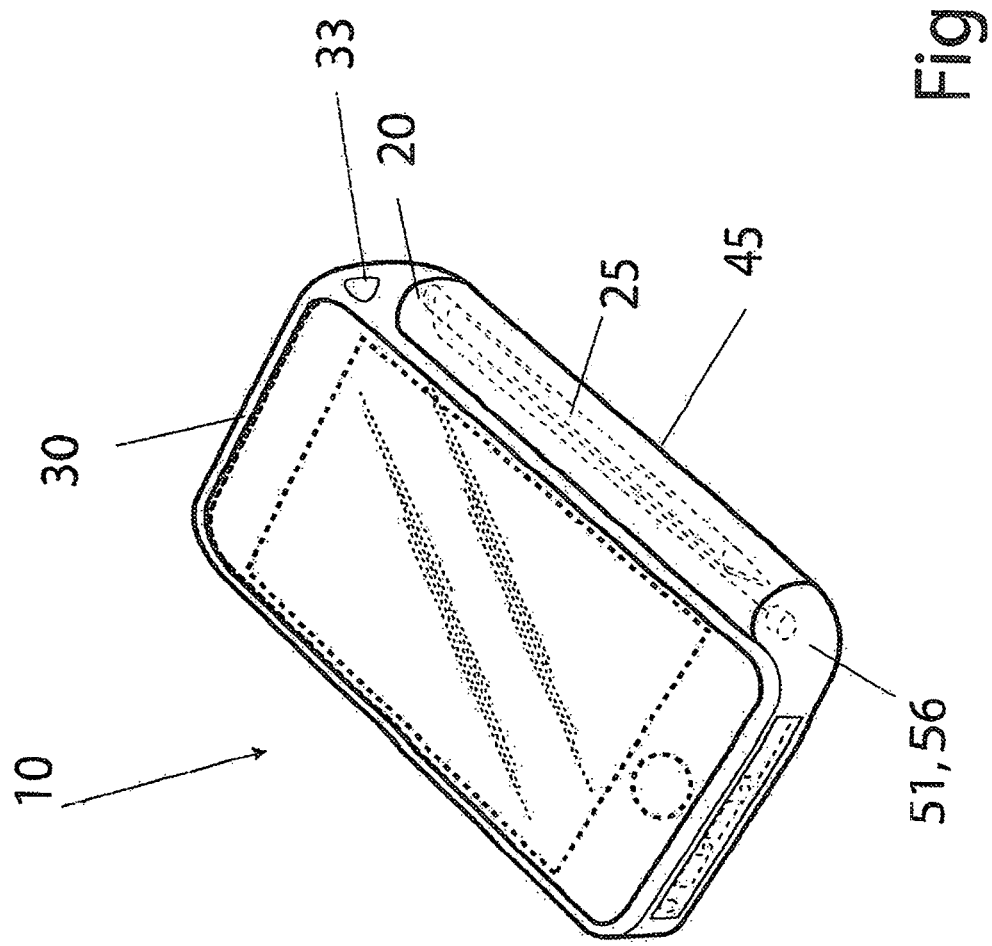

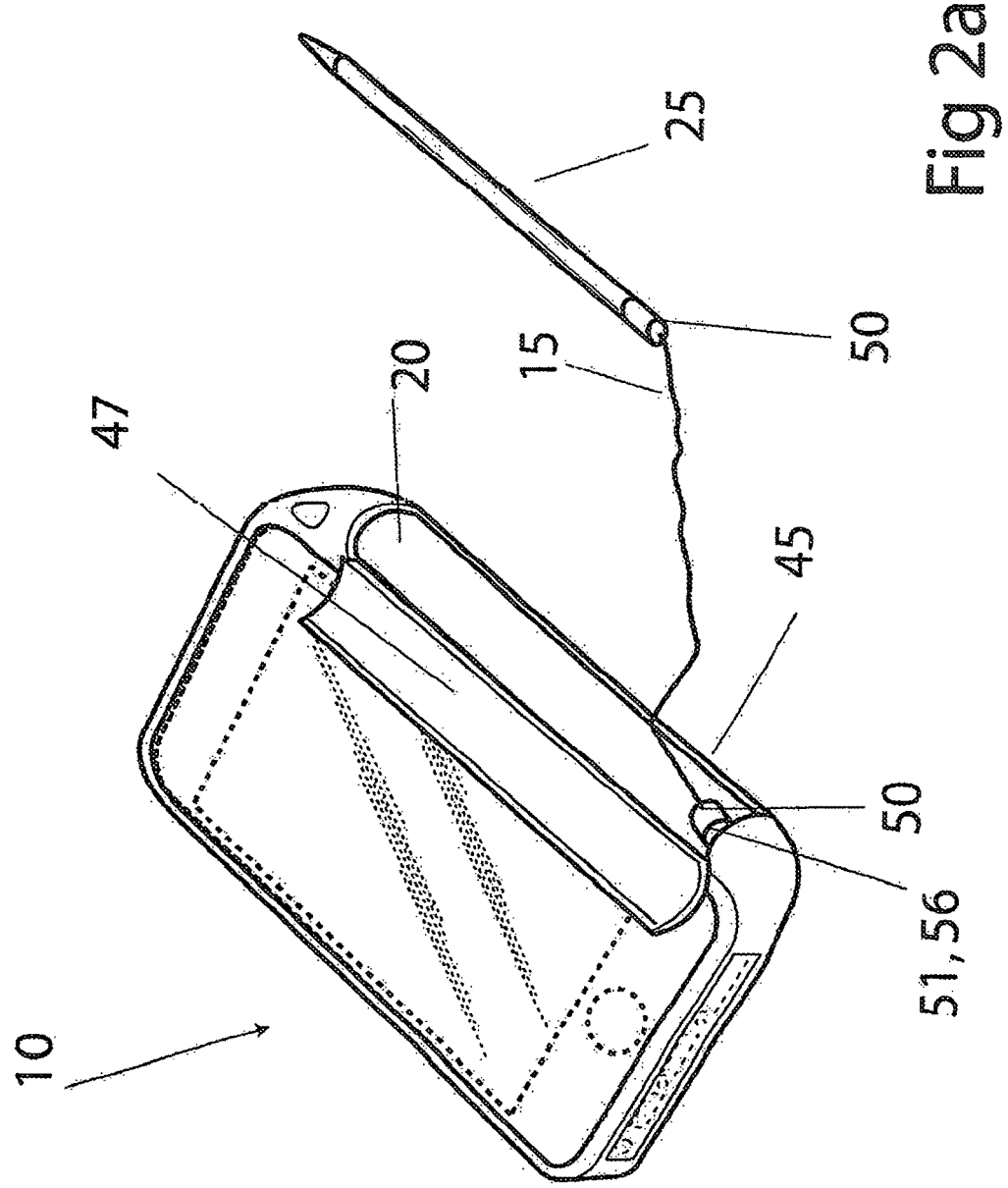

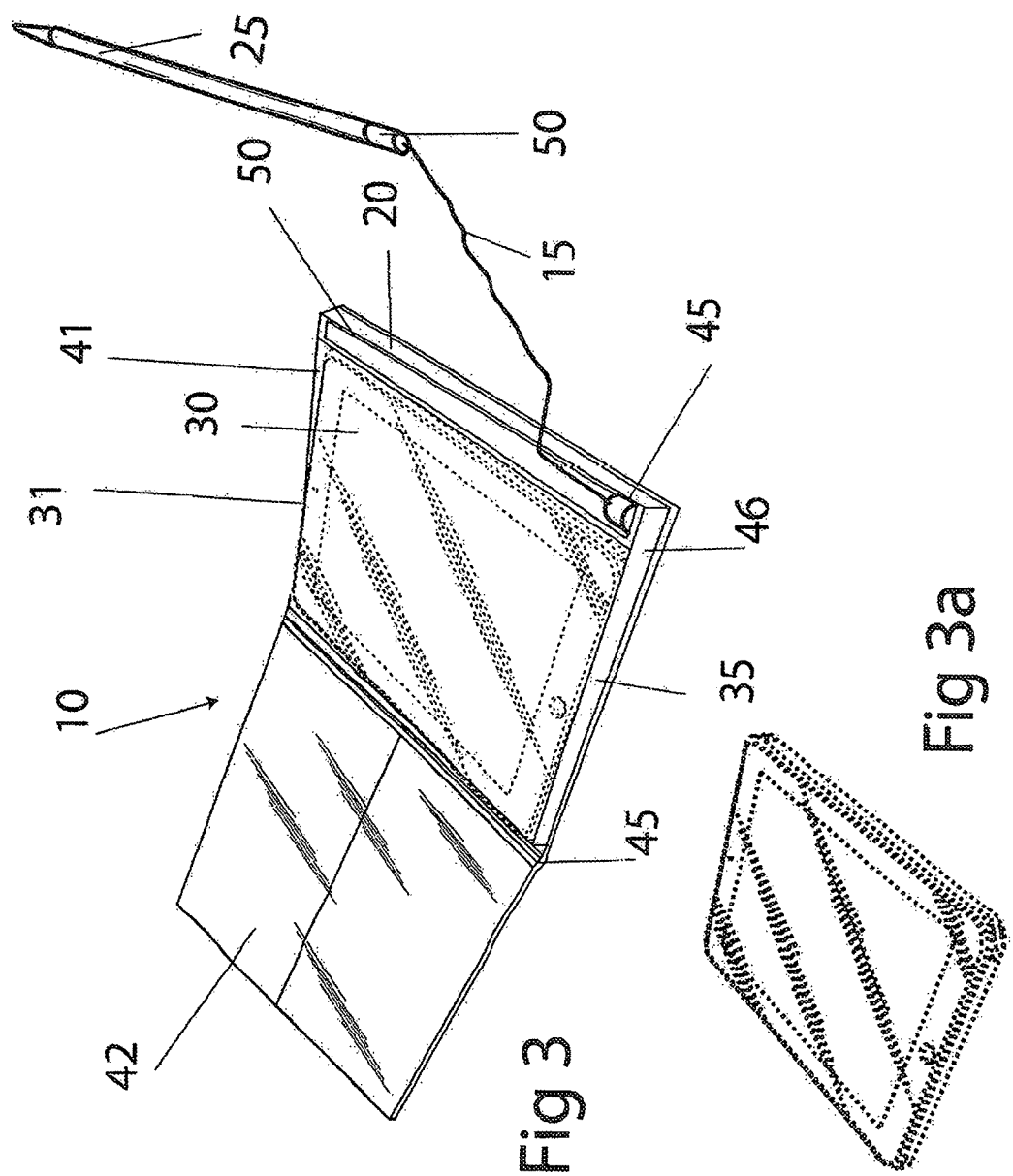

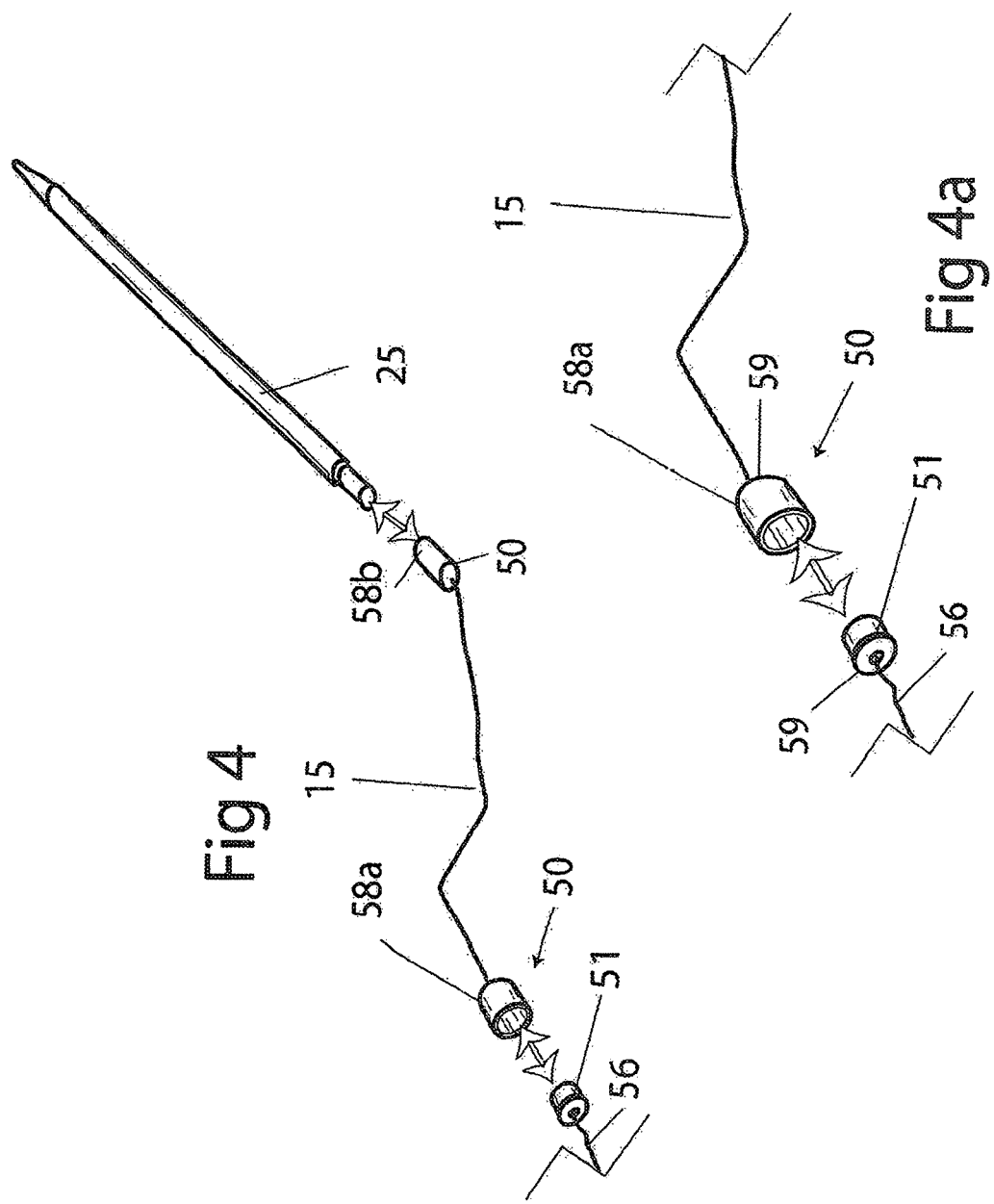

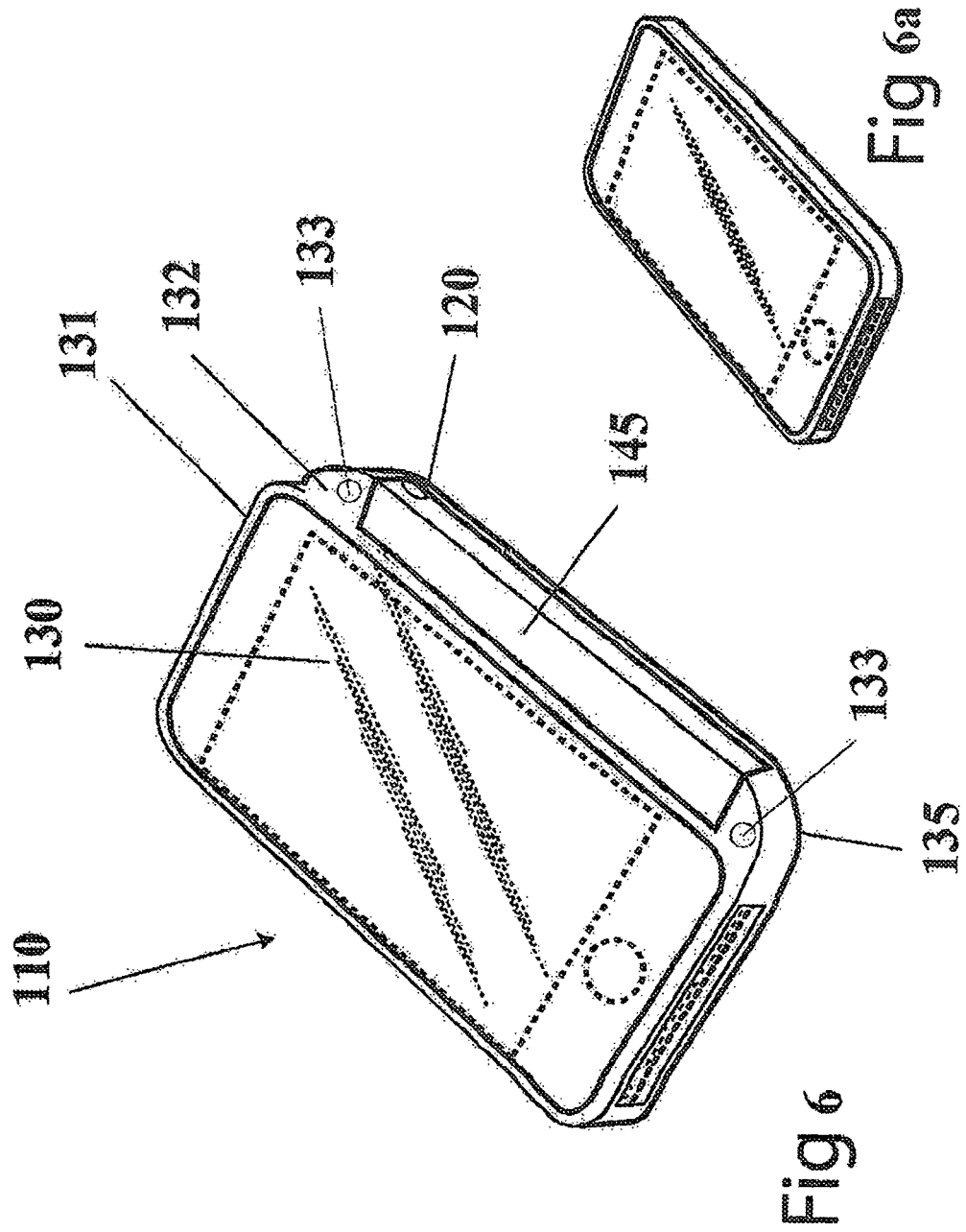

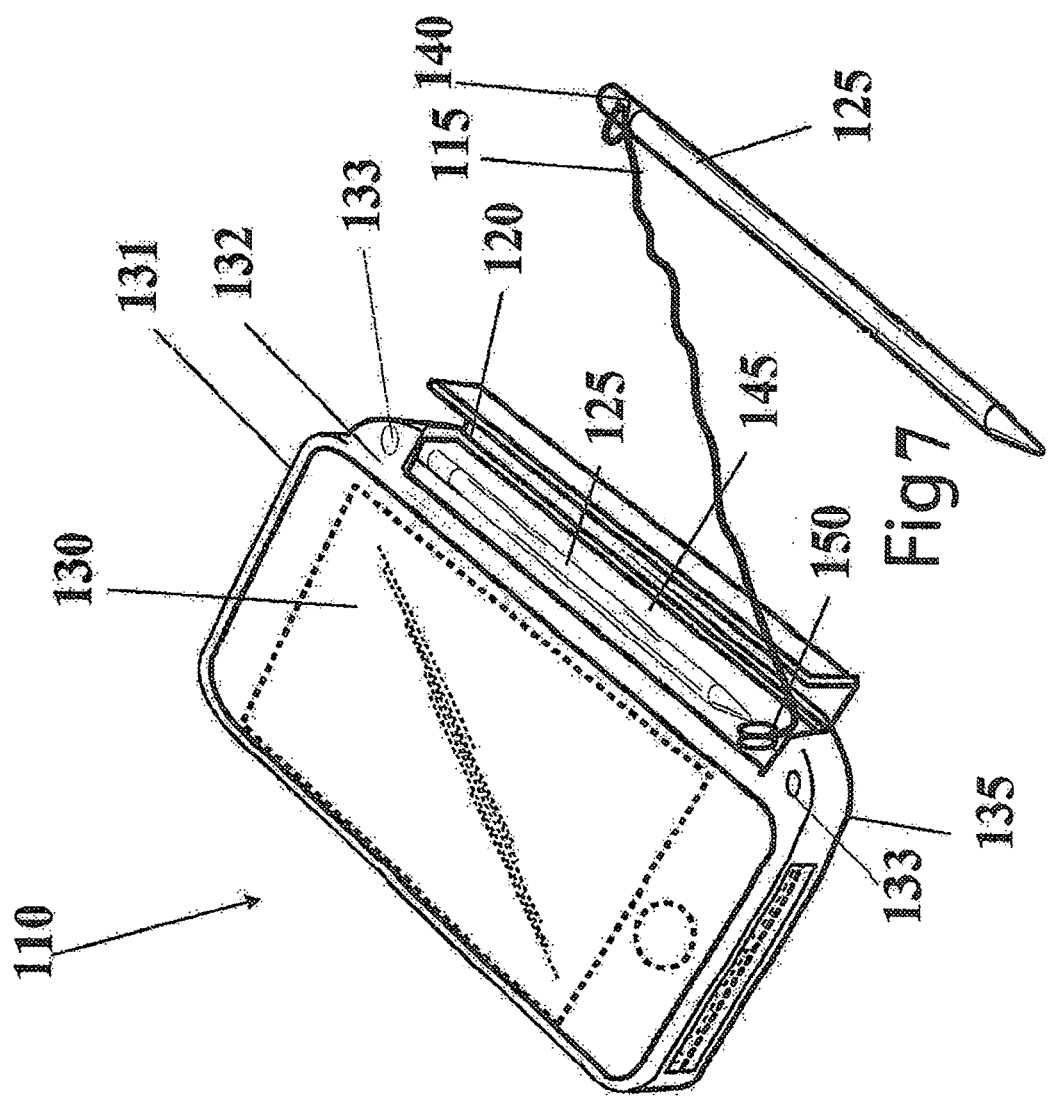

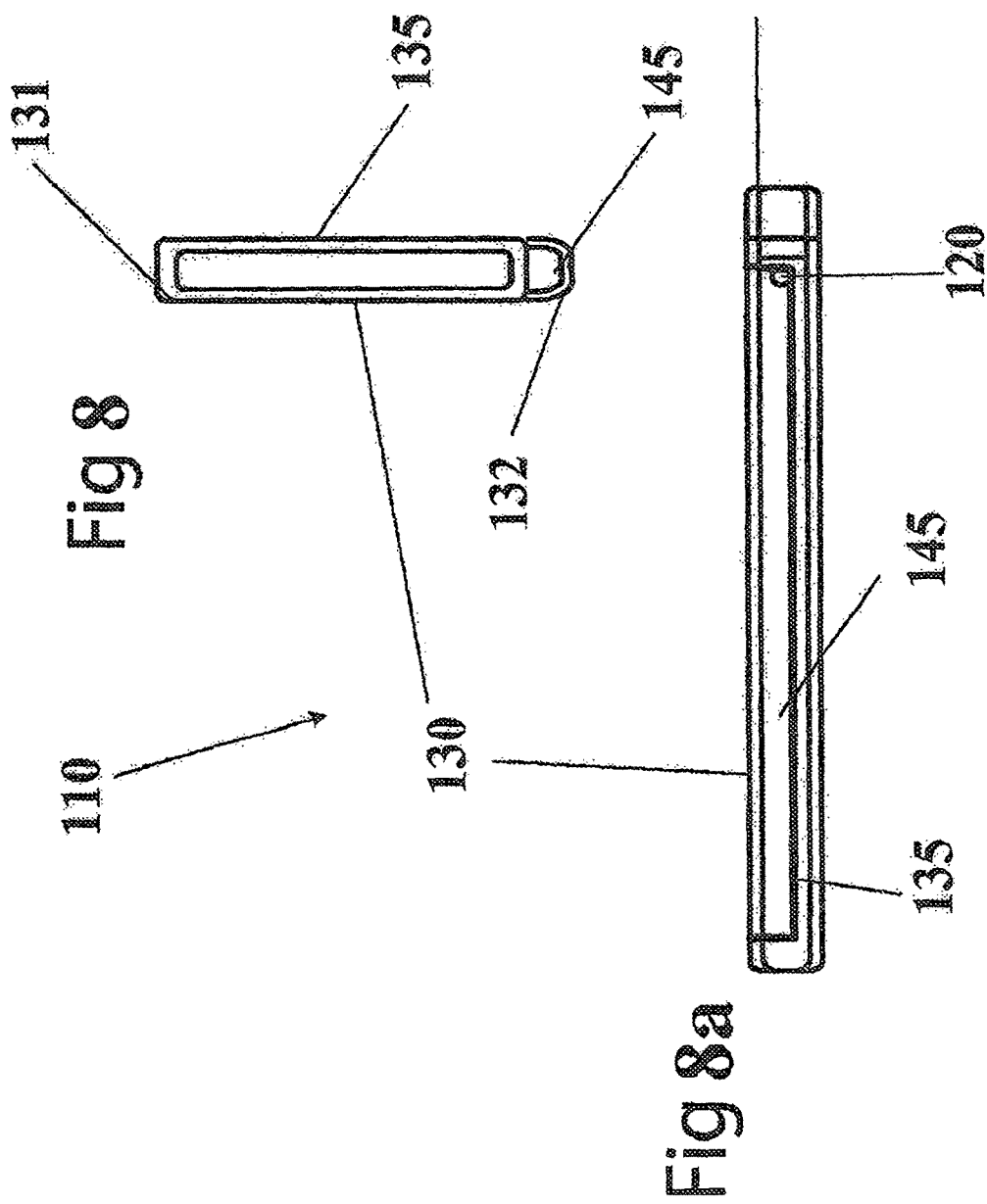

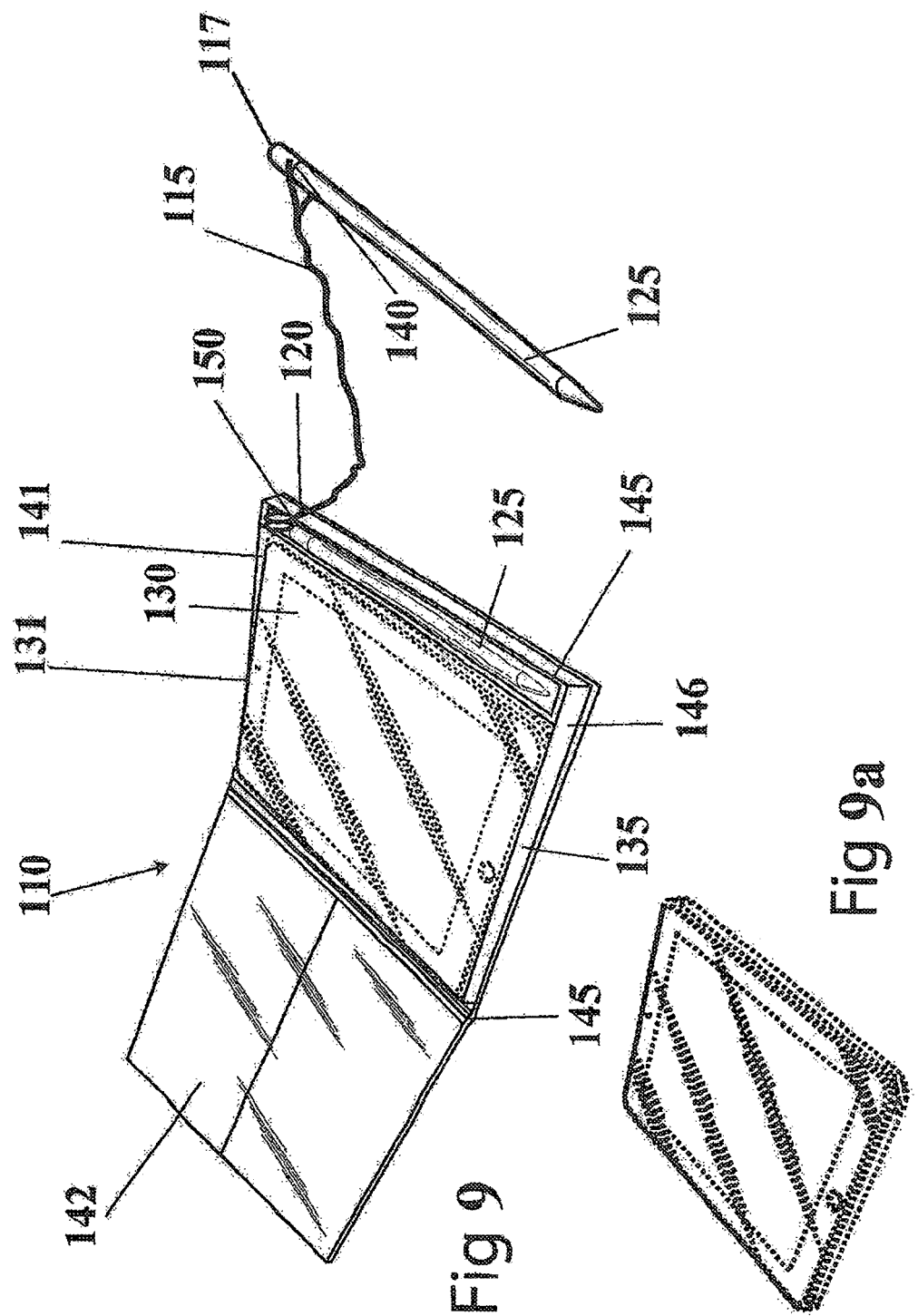

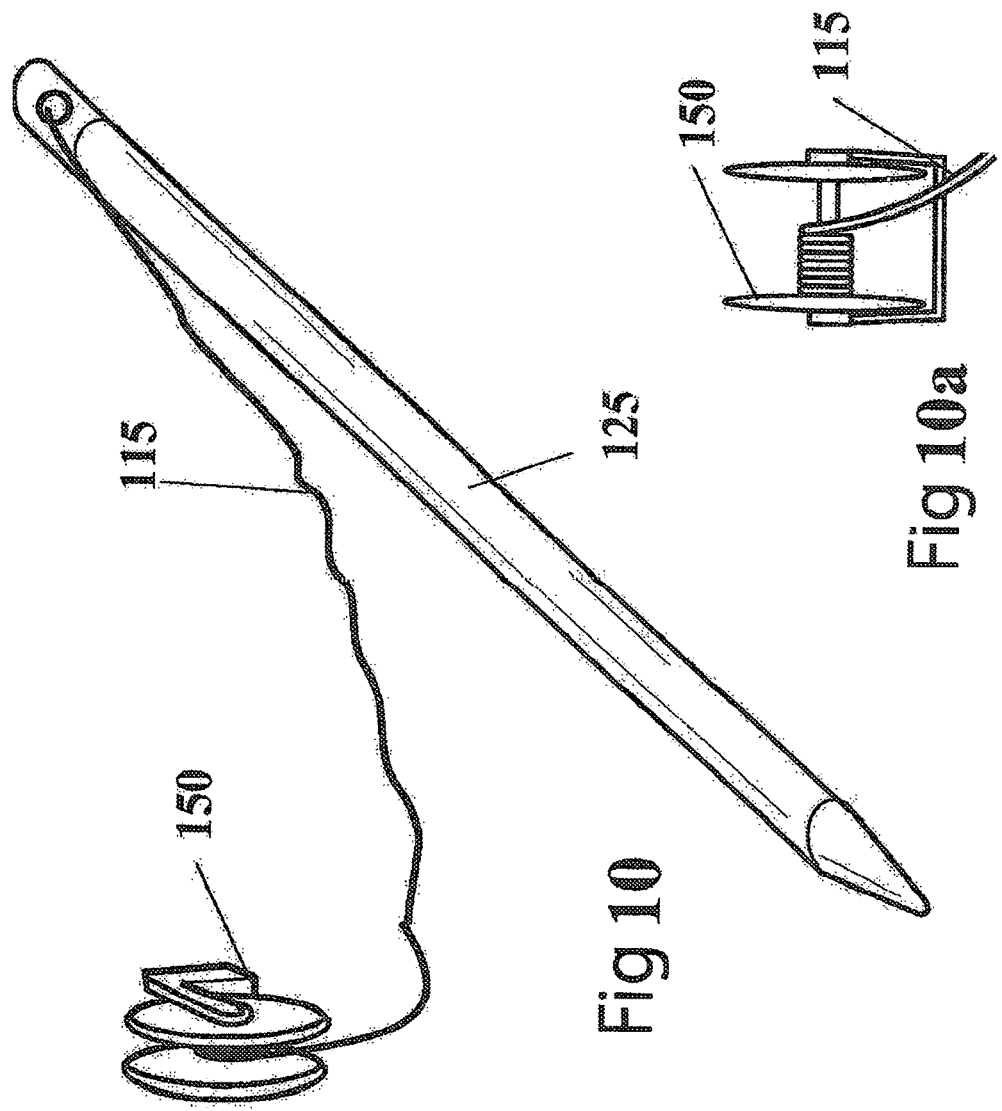

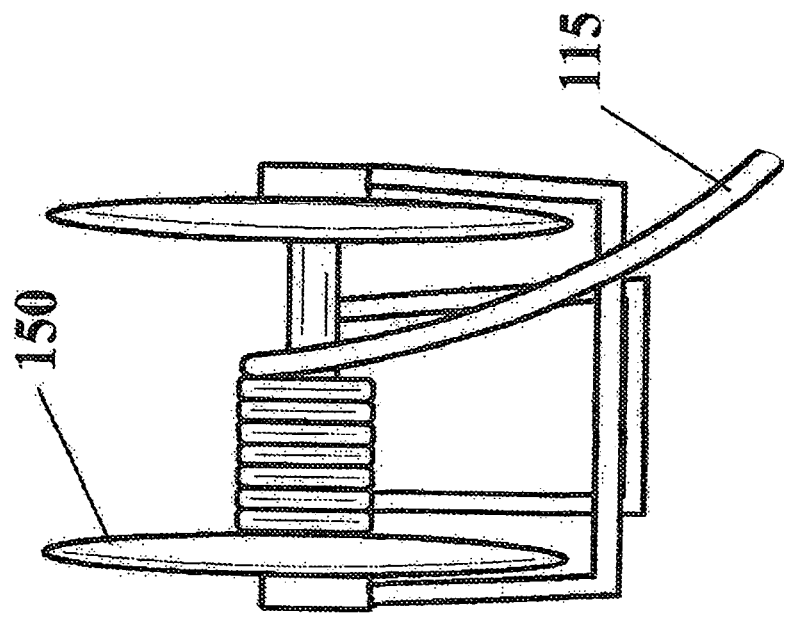

TELECOMMUNICATIONS CELL AND SATELLITE PHONE CASE WITH STYLUS PEN AND STORAGE COMPARTMENT FOR THE PEN

This case is a continuation in part and claims the benefit of provisional application 62/300,943 as well as the parent application of the provisional patent.

BACKGROUND OF THE INVENTION

This invention relates to the field of protective cases, for portable hand held electronic devices. Portable electronic devices (PEDs) such as cell and satellite phones are being widely used today. Portable electronic devices or PED devices are made to operate with the touch of a stylus pen and/or finger touch to a dizitaler. The use of a stylus is common due to the small size of some of the PED models and/or with the combination of large fingers and hands. This can make texting very frustrating. However a stylus can easily be lost if not attached to the PED how should the stylus pen be attached?

In reference to the prior art of U.S. Pat. No. 5,267,123 Boothroyd; Allen (1993), a stylus compartment is disclosed for a non-held-hand computer case, (a non-hand-held case would rest on a table versus resting in one hand). U.S. Pat. No. 5,267,123 also discloses a portable hand-held PED device to which the stylus pen can be attached. However the patent does not describe how the stylus pen would be attached to the hand-held PED device. There is a description of how the stylus pen is attached to the computer case, However there is no mention of attaching the stylus pen to a cell or satellite phone with a protective case. The stylus pen compartment of U.S. Pat. No. 5,267,123 was disclosed in reference to computers only.

In 1993, no claim is made by Boothroyd; Allen for a telecommunication (cell or satellite phone) protective PED case that incorporates the use of a stylus pen compartment, possibly because in 1993, cell phones were not yet in wide use due to cost restraints. This is possibly a reason as to why U.S. Pat. No. 5,267,123 made no claim at the time for a telecommunications cell phone case, which incorporated the use a of a stylus pen compartment.

The first text message was sent in 1993, and a cell phone in 1993 cost $1099.00. (see bubusinessed.com, History of Mobile Cell Phones—The First Cell Phone To Present T 1993's IBM Simon: The First Smartphone?) By February 1995 they had sold a total of 5 cell phone units.

In reference to the prior art of U.S. Pat. No. 5,576,941 Snell; Jeffery D.—Claim 1 discloses a first and second attachment for a tethered lanyard. The first attachment is tethered to the dizitizer or PED device. The second attachment connects to a stylus pen. However for reasons stated below it is important to some users to have the pen tethered to a protective case verses directly tethered to the PED device. U.S. Pat. No. 5,576,941 under "Background of the Invention" column 2, paragraph 60 states;

"As noted a digitizer pen tether is a welcome addition for some users. However, many users will wish to have untethered digitizer pens, thus manufacturers of hand-held computers may not want to manufacture products with tethered digitizer pens."

Therefore according to U.S. Pat. No. 5,576,941—PED users who want to use tethered pens are at a disadvantage because their product may be in short supply. A solution to this problem would be to manufacture PED protective cases that do have tethered stylus pens. This way each individual person could decide whether they would like to have a tethered stylus pen with their PED device or not. Persons seeking to be more organized would appreciate a stylus pen tethered to a PED case; therefore I propose to make a claim of attaching a lanyard with the first attachment tethered to a cell phone protective case, versus attaching the lanyard directly to the PED device as claimed in U.S. Pat. No. 5,576,941.

SUMMARY OF THE INVENTION

The main objective of this invention is to provide a telecommunications protective cell/satellite phone case which is made specifically for telecommunication devices, which incorporates the use of a stylus pen and a stylus pen compartment. The main objective of the telecommunication device case (here in referred to as TDC) is to provide a base upon which to anchor the stylus pen and the corresponding stylus pen compartment, therefore giving individuals the choice of whether or not to use an anchored stylus pen with their telecommunication devices.

Other objectives of this invention are as follows:
a. to have a lanyard tethered to a telecommunications protective case for cell and satellite phones at attachment one, verses direct attachment to the PED device.
b. to provide storage for the stylus and tether in a compartment which is made of flexible material, so as to provide the capability of replacing the lanyard with easy access to the first attachment, within the storage compartment.
c. to provide a stylus pen with an easy release lanyard anchor, so that the lanyard may be easily replaced if it becomes worn or broken.
d. to make the tethered cord tangle resistant, by having a lanyard that is free to rotate within the anchors on each end of the lanyard.

The present invention comprises a telecommunication protective cell/satellite phone case, which incorporates the use of a stylus pen and a stylus pen compartment.

The storage compartment extends is made of flexible material such as woven fabric, or/and silicon, or any flexible natural or synthetic material. The storage compartment has a flexible opening on the side that allows for the stylus to be easily placed therein. The flexible opening also allows for more ease when replacing the tethered lanyard.

The opening to the storage compartment is closed with various methods; Examples not limited to; snaps, or Velcro, and/or zippers. Closure method also includes utilizing the ability of soft molded plastics to return to their original shape, after being manipulated into a new shape.

The storage compartment is made of silicon or other flexible material that is molded into the shape of a storage compartment. The flexible material can be manually manipulated into a open position to retrieve the stylus. If the tension is released on the molded compartment (when in the open position), the compartment will automatically return to its original molded closed position.

These and other details of the present invention will be described in connection with the accompanying drawings, which are not furnished only by way of illustration and not in limitation of the invention.

FIG. 1 is a telecommunication device (cell phone).

FIG. 1*a* is a diagram of a cell phone, within a telecommunication protective case, with a peripheral extension to encase a stylus pen and lanyard.

FIG. 2 is a cutaway view of the concealed stylus pen, within an a compartment made of flexible silicon.

FIG. 2a is a view of the molded compartment being forced open with manual tension to expose and extend the stylus pen.

FIG. 3 is the lanyard attached within a notepad.

FIG. 3a depicts the notepad in a closed position.

FIGS. 4 and 4a are a close up view of the stylus lanyard attachment anchor, which is tangle resistant.

FIG. 6 is a diagram of a stylus lanyard having a first attachment means.

FIG. 6a depicts a cell phone which includes all types of PEDs that could fit into a protective case.

FIG. 7 is a diagram view of the case with the tether attached to the stylus from an outstretched view from the stylus compartment.

FIG. 8 is a top view of the upper section of the present invention.

FIG. 8a is a side cutaway view of the of the storage compartment.

FIG. 9 is an open view of an alternative protective case for a tablet or IPad type device showing an exploded view of the tether and stylus from the compartment.

FIG. 9a is a side view of a tablet or IPad.

FIG. 10 is a cutaway view of the tether, stylus, and retracting apparatus.

FIG. 10a is a cutaway view of the retracting apparatus.

FIG. 11 is a cutaway view of the spring for the retracting apparatus.

DETAILED DESCRIPTION OF THE INVENTION

Figure 5:
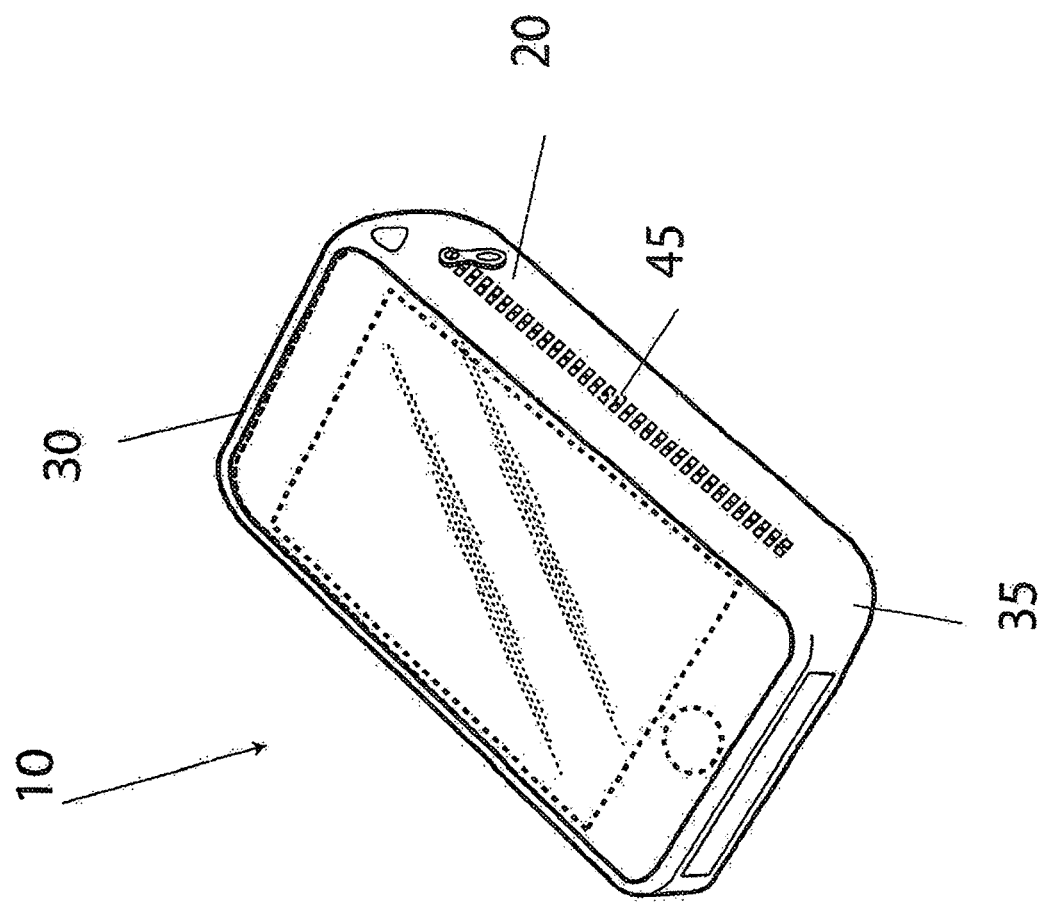
FIG. 5 is a view of a TPC using a zipper to open and close the stylus compartment which is made of flexible and/or stretchable material.

FIG. 1 illustrates a telecommunications device (cell phone). FIG. 1a, is an illustration of a telecommunication device case TDC (10) for a cell phone, which is shown in exemplary form. The invention herein discloses a telecommunication device case with a flexible stylus storage compartment (20) built within an extension (35) integrally attached to the peripheral edge of one side of the protective case to house a tethered stylus pen (25). A slit (45) running the length of the stylus compartment makes for easy access, when replacing worn or broken lanyards.

FIG. 1a illustrates one embodiment of the telecommunication case (10). As depicted, the protective case (10) includes a lower housing (35) with an attached storage compartment (20); a mounting face (30) sized to receive the back face of the telecommunication device (31); and a device-securing (33) means for securing the cell/satellite phone within the protective case (10). The size and shape of the protective case (10) and the stylus compartment (20) may vary for different sizes, makes, models and types of cell/satellite phones.

The telecommunication case (10) is made of both non flexible and flexible materials, and natural and/or synthetic materials. Examples are not limited to; hard and soft plastics, metals, silicon, pliable woven products (made of both natural and synthetic materials), stretchable materials (Spandex).

The telecommunication case (10) will be configured so as not to detract from other features of telecommunication device (31) such as volume controls, recharging ports, cameras and other features.

The protective case (10) that encompasses the telecommunication devices (31) are made of durable rigid material, covered with a more flexible material such as silicon. The two materials are bonded together, so that the case is made of two layers of contrasting material. The stylus compartment (20) that extends to encompass the stylus pen (25), will be made primary of more flexible material. This is to facilitate the easy removal and replacement of the pen. As shown in FIG. 2 and FIG. 2a.

As shown in FIG. 1a, lower housing (35) is confirmed to be secured to the back face of the telecommunication device (31) disposed below the display screen which is the upper face of the telecommunication device (31). Lower housing (35) is preferably sized to approximate or match the dimensions of the back face of the cell/satellite phone (31) in order to form an unobtrusive extension of the telecommunication device (31) in order to maintain the cell/satellite phones' (31) convenience, aesthetics and portability. The housing (35) receives the telecommunication device (31) without obscuring the screen for use and where the back, bottom, sides, and upper portion is against or adjacent to the housing (35) when the cell/satellite phone (31) is securely placed within the lower housing (35).

The device-securing means may be one or more structures integrated with the lower housing (35) example not limited to snap tabs formed on the mounting face, lip or frame. Device securing means (33) secures the upper face of the telecommunication device (31) within the open face of the housing(35).

FIG. 2 is a cutaway view of the concealed stylus pen (25), with a molded flexible compartment (20) The stylus compartment (20) is a integrally attached to one side of the protective case (10) and conceals a stylus (25) while not in use. As depicted the stylus compartment (20) extends the length of the telecommunication case. (10). An opening (45), also extends the length of the stylus compartment (20). The stylus compartment (20) is made of durable non flexible materials, in addition to flexible and/or stretchable materials. The flexible material is to facilitate the easy removal and replacement of the tethered worn lanyard. Examples of flexible materials not limited to; Silicon and Spandex. Closure/opening (45) of the compartment (20) may be accomplished by several means but is not limited to said examples such as; zippers, snaps, Velcro and Ziploc.

FIG. 2a discloses a view of the molded flexible compartment (20) being forced open with manual tension (with use of the hand and fingers) to expose the stylus (25). A flap (47) runs the entire length of the stylus compartment (20). Pulling up on and extending this flap (47) opens up the compartment (20) for easy access. Returning to a view of FIG. Ia, we see the compartment (20) closed shut when the manual tension is released. Without any stress or tension the molded material reverts back to the original shape it was molded into.

A tether/lanyard (15) is a cord, fixture, or flexible attachment that anchors something that is movable to a reference point which may be fixed or moving. The stylus lanyard (15) has sufficient length and flexibility so that the telecommunication device (31) can be readily operated with the stylus.

The replaceable detachable cord (15) is manufactured in different lengths to accommodate the size of the TDC (10), and the preferences of the user.

FIG. 2a discloses a lanyard (15) having a first attachment means tethered to the TDC (10) extension (56), and the second attachment means tethered a tangle free stylus pen (25). The lanyard (15) is made of natural and/or synthetic man made materials. The cord is single or three ply, lightweight and flexible.

FIG. 2a discloses the TDC extension (56) with screw attachment (51) at the connection point (58a). The TDC extension (56) is a flexible extension attached to the TDC (10). The extension (56) is attached to the integral part of the frame of the TMC (10). It is made of durable flexible material. It is an extension (56) to which the screw attachment (51) detaches from the lanyard anchor(50) at connection point (58a). The extension (56) protrudes out of the frame of the TDC and is embedded in the lower distal end of the stylus compartment (20). The purpose of the TDC (10) extension (56) is to make the connection point (58a) within the stylus compartment (20) more accessible when replacing the lanyard (15).

FIG. 2a and FIG. 3 disclose a stylus pen which is tangle resistant and detachable. A stylus (25) is a writing utensil that can be used as a cell phone/satellite accessory to navigate and provide precision when using a touch screen device. A stylus (25) is comprised of a small cylindrical shaft that has a sharpened point on one end. The stylus (25) allows the user to make contact with the touch-screen commands or small buttons using the stylus pen (25) in place of a finger tip. FIG. 2a discloses a method for attaching a stylus pen to a TDC (10). FIG. 2a shows the anchor (50) of the first attachment means of the lanyard (15) attached to the TDC (10) extension (56) by means of a screw (51) and an identical anchor (50) on the other end of the lanyard (15), which screws onto the distal end of a tangle resistant, detachable, and replaceable stylus pen (25) at the second attachment point (58b).

FIG. 3. discloses the lanyard (15) anchors supports (50) in greater detail. The lanyard (15) anchor supports (50) are located on each end of the lanyard. The two lanyard (15) anchor supports (50) are constructed in identical detail and form. the lanyard (15) is easily replaced due to wear or breakage, by detaching the lanyard (15) at the anchor support (50) connection points (58a 58b).

FIG. 3a is a cut away view of the the lanyard (15) anchor supports (50). The lanyard (15) is threaded through a hole (59) in the center of the lanyard anchors (50). The lanyard (15) is secured within the anchors (50) with a knot (57) at the end of the lanyard (15). The insertion point (59) of the lanyard (15) is coated with a smooth hard natural or synthetic material to prevent wear an the lanyard (15). The protective hard coating extends to coat both distal ends of the lanyard (15), including the knots (57) in the anchors. The hard smooth protective coating is bonded to the lanyard through different methods such as heating the protective coating to form a seal to the lanyard, or using an adhesive.

The protective coating on the lanyard, protects the lanyard from wear due to friction and also allows the lanyard (15) to rotate more freely within the anchors (50) due to reduced friction.

Concealed within the anchor support (50) chamber is the lanyard securing knot (57). The lanyard securing knot (57) is free to rotate within the anchor support (50) chambers, making the lanyard (15) more resistant to tangling, which might other wise occur, due to twisting the lanyard.

Other tangle resistant methods maybe used.

Other detachment/attachment methods maybe used, which may or may not be related to the disclosures in FIG. 2a and FIG. 3.

These are some of the alternate prior art methods with possibilities for quick and easy detachment/attachment of the lanyard. There are many possible prior art methods, entitled to royalties that could be used with permission, to provide quick and easy detachment means, which are not limited to the examples provided below. Other detachment/attachment methods that can be used are as follows:

a) a push button quick release method
b) a twist and snap together method which is already widely used today. Two cylinder tubes are twisted, one tube inside the other, and aligned correctly, so that small cylinder knobs pop out of circular openings located on the outer cylinder to secure the "locked" position of the two cylinders. Manually compressing the cylinder knobs, while simultaneously twisting the cylinders, releases the "locked" position.
c) a lanyard threaded through an rotating eyelet, with snap attachments on each end of the lanyard to secure each lanyard end to an accompanying rotating eyelet.

In FIG. 3 the first TDC attachment/detachment means is disclosed. The first TDC (10) attachment means (51) is a screw attached to an extension (56) protruding out of the frame of the TDC (10), and embedded in the lower distal end of the stylus compartment (20). The TDC lanyard anchor (51) with extension (56) is attached/detached at connection point (58a) by unscrewing the lanyard anchor (51), at attachment one connection point (58a).

Depicted in FIG. 4 is an alternative embodiment of a TDC (10) with a flexible stretchable stylus compartment (20). In this example the storage compartment (20) is made of Spandex. The closure/opening devise (45) is accomplished with a zipper, whose teeth are constructed of metal or a synthetic material.

Referring to FIG. 6-11, alternative embodiments of the present invention are shown. The invention herein discloses a stylus (125) which is positioned in a provided storage compartment (145) integrally attached to the peripheral edge of one side of the protective case (110).

FIG. 6 illustrated one embodiment of the protective case (110). As depicted, the protective case (110) includes a lower housing (135) with an attached storage compartment (145); a mounting face (130) sized to receive the back face (132) of a PED (131); and a device-securing means for securing the PED within the protective case (110). The size and shape of the protective case (110) may vary for different sizes, makes, models and types of portable electronic devices. The case (110) can be made from a molded polymer material, flexible silicon or another suitable flexible material. The case (110) will be configured so as not to detract from other features of the device (131) such as volume controls, recharging ports, cameras and other features.

As shown in FIGS. 6-7, lower housing (135) is configured to be secured to the back face of the device (131) disposed below the display screen which is the upper face of the PED (131). Lower housing (135) is preferably sized to approximate or match the dimensions of the back face (132) of device (131) to form an unobtrusive extension of the device (131) in order to maintain device's (131) convenience, aesthetics and portability. The housing (135) receives the device (131) without obscuring the screen for use and where the back, bottom, sides and upper portion is against or adjacent to the housing (135) when the PED (131) is securely placed within lower housing (135).

The device-securing means may be one or more structures integrated with the lower housing (135) such as (Ibut not limited to) the snap tabs formed on mounting face, lip or frame. Device securing means (133) secures the upper face of the PED (131) within the open face of housing (135).

Compartment (145) is a integrally attached to one side of the case (110) and conceals stylus (125) while not in use. As depicted compartment (145) extends vertically downward the length of case (110). A hingedly connected lid traverses between an opened and closed position allowing stylus (125) to be concealed therein.

A small pen-shaped stylus (125) is utilized in much the same way as a pen. As depicted stylus (125) comprises a small cylindrical shaft that has a sharpened point on one end. Stylus (125) is a writing utensil that can be used as a computer accessory which can be used to navigate and provide precision when using any touch-screen device. The stylus (125) allows the user to make contact with the touch-screen commands or small buttons. Using a fingertip in place of the stylus (125) is sometimes difficult, as the tip of a finger is broad compared to the small touch-screen command buttons.

The stylus (125) is attached by way of a tether (115) within compartment (145). A tether (115) is a cord, fixture, or flexible attachment that anchors something that is movable to a reference point which may be fixed or moving. The tether (115) has a sufficient length and flexibility so that the device can be readily operated with the stylus (125).

The tether (115) can be made of plastic cord or another suitable type of material. A anchor support (150) can be located on a corner within compartment (145). The stylus (125) has an eyelet (140) on one end, and the tether (115) is looped through the eyelet (140). Stylus (125) can be made of plastic, aluminum or another suitable material. Tether (115) have one end securely attached within compartment (145) and the opposite end attached to the end of the shaft of stylus (125).

Anchor support (150) can be retractable as depicted in FIGS. 5, 5a and 6. Retracting apparatus (150) is attached to the stylus (125) and securely mounted within a portion of compartment (145). In the depicted embodiment, retracting apparatus (150) has a spool upon which tether (115) is wrapped around. In other embodiments retracting apparatus (150) can be coil-type or spring biased which provide the function of allowing the stylus (125) to be pulled from the compartment (145) for use on the PED, and then upon release to be automatically retracted back into compartment (145). The retracting means (150) can be increased or decreased in strength to meet the requirements for extracting the stylus (125) therefrom.

As depicted, the stylus storage compartment (145) has a closed bottom side with a hingedly connected lid that opens and closes to conceal the tethered stylus (125) therein. In other embodiments the storage compartment (145) bottom side can have small recess areas to contain storage of small office articles such as paper clips, pen or other small accessory items. Compartment (145) containing the stylus (125) and retracting apparatus (150) is designed to allow for all technical features of the device (131) to be accessed as are other protective cases in the industry.

Referring generally now to FIGS. 7 and 10, the stylus (125) is secured to the retracting means (150). In the illustrated embodiment, stylus (125) has an eyelet (140) on the end opposite the pointed end. The tether (115) is threaded through the eyelet (140) to secure the stylus (125) thereto. Additionally the eyelet (140) is structured to prevent tether cord from being tangled during use.

Retracting means (150) may take different forms, and the retraction force may be provided by spring-tension as shown in FIG. 10. The spring-tensioned retracting means (150) is designed to automatically retract stylus (125) back into concealed compartment. Illustrated retracting means (150) includes a spring reel mechanism comprising a coiled torsion spring wound around and secured to a post to an inner end and containing a rotatable wheel. The retracting apparatus (150) is attached to and constructed within the stylus storage compartment (145). In the illustrated embodiment, the retracting apparatus (150) is attached at the upper end of compartment (145). In embodiments the end cap of the stylus can rotate 360 degrees thereby preventing tangling of the cord. Alternatively, the anchor attachment to the tether can Depicted in FIGS. 9 and 9a is an alternative embodiment of protective case (110). In this illustrated embodiment, the front cover (142) is hingedly connected to a back cover (146) which receives the backside of a notebook computer (141), IPad or another suitable size PED. The back cover (146) forms a storage compartment that receives the notebook computer (131) therein. Device securing means secures the notebook computer (131) within back cover storage compartment (146). Storage compartment (145) extends vertically the length of the back cover (146) and receives stylus (125) therein.

What is claimed:

1. A protective enclosure for storage of a stylus that is attached to a telecommunication device, the protective enclosure further comprising: an elongated body defined by an upper layer overlaying and abutting a lower layer forming an inner compartment for receiving the styles therein; a peripheral edge of the upper layer and the bottom layer attached to an outer peripheral edge of the telecommunication device; the opposing sides of the elongated body are attached leaving one edge of the elongated body to form an opening for access into the inner compartment wherein a storage area is formed for receiving the stylus there in; the stylus being a separate unit from the elongated body telecommunication device; a lanyard defined by a top attaching element and a distal end attaching element with each element having a non-tingling mechanism incorporated therein; the top attaching element of the lanyard being having one end operationally connected to an anchor support which is operationally mounted to an inner wall of the elongated body and the distal attaching element of the lanyard being operationally connected to the having an opposite end operationally attached to the stylus wherein the stylus can be placed within and removed from the storage area.

2. The protective enclosure of claim 1 wherein the upper layer forms a lid with the capability of transitioning between an opened and closed position for allowing the stylus to be placed within and removed from the storage area.

3. The protective enclosure of claim 1 wherein the lid is hingedly attached to a side edge of the lower shell providing the capability of transitioning between an opened and closed position for allowing the stylus to be placed within and removed from the storage area.

4. The protective enclosure of claim 1 wherein a small retractable unit is operationally coupled to the anchor support and to the lanyard providing the ability to retract and release the lanyard to a desired length while the stylus is in use.

5. The protective enclosure of claim 1 wherein the elongated body is configured to connect to any edge of the telecommunication device.

6. The protective enclosure of claim 1 wherein the lower layer further comprises at least one small fastener operationally coupled to an inner wall thereto for attaching to small accessory items therein.

7. The protective enclosure of claim 1 wherein the upper layer the further comprises at least one small fastener operationally coupled to an inner wall of the lower layer for attaching to small accessory items therein.

8. The protective enclosure of claim 1 wherein the anchor support further comprises a spring biased retracting unit operationally connected therein.

9. The protective enclosure of claim 1 wherein the lanyard is a flexible cord of a predetermined length.

10. The protective enclosure of claim 1 wherein the top attaching element is detachable.

11. The protective enclosure of claim 1 wherein the distal attaching element is detachable.

12. The protective enclosure of claim 1 wherein the lanyard is extendable to a selectable length.

\* \* \* \* \*

UNITED STATES PATENT AND TRADEMARK OFFICE
CERTIFICATE OF CORRECTION

PATENT NO. : 10,411,748 B1
APPLICATION NO. : 15/992169
DATED : September 10, 2019
INVENTOR(S) : Lee Joan Lucente Page 1 of 1

It is certified that error appears in the above-identified patent and that said Letters Patent is hereby corrected as shown below:

In the Claims

The word "non-tingling" in Claim 1 should to be corrected to "non-tangling" in Column 8 Line 32.

In Column 8 Line 37 Claim 1 the word "the having" should be deleted.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*